A. A. RADTKE.
ELECTRIC MOTOR.
APPLICATION FILED DEC. 12, 1910.
1,131,614.
Patented Mar. 9, 1915.
3 SHEETS—SHEET 1.
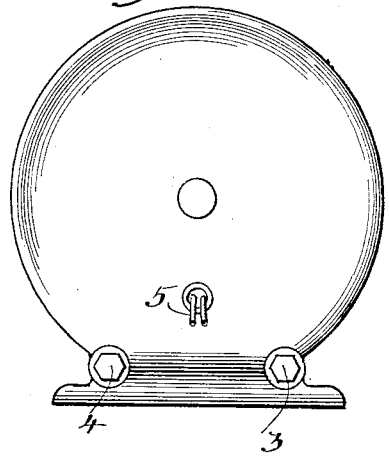
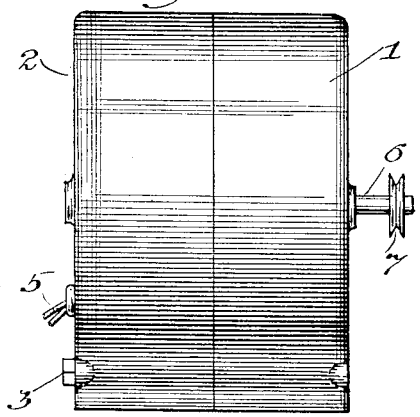
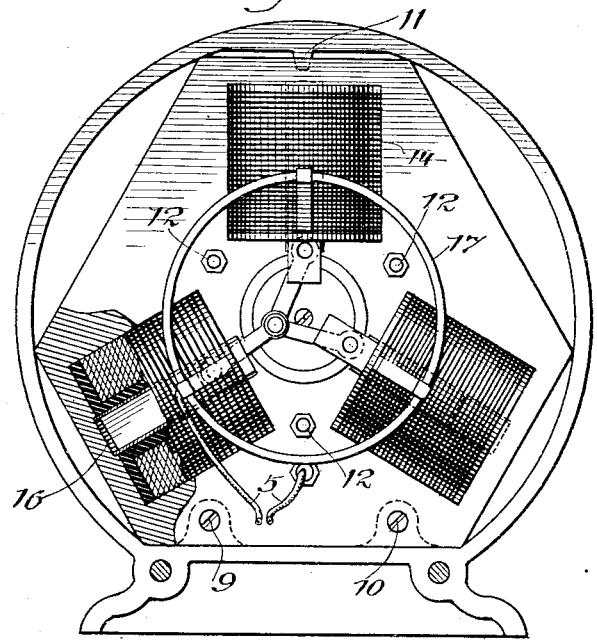

A. A. RADTKE.
ELECTRIC MOTOR.
APPLICATION FILED DEC. 12, 1910.
1,131,614.
Patented Mar. 9, 1915.
3 SHEETS—SHEET 2.
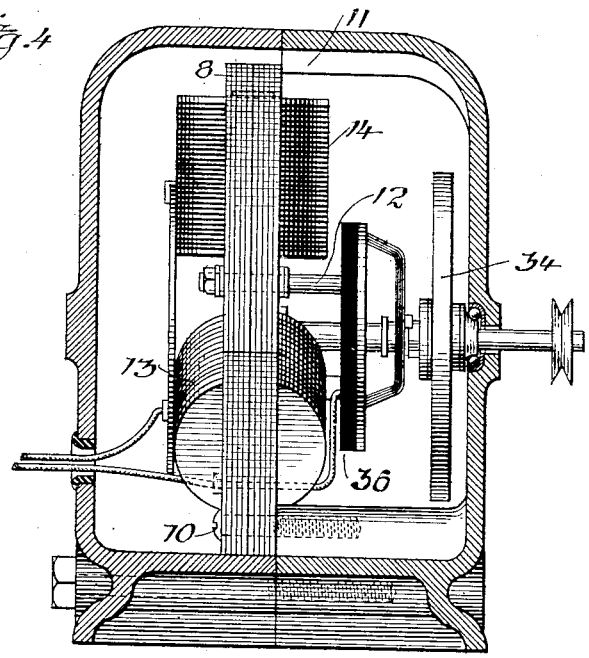
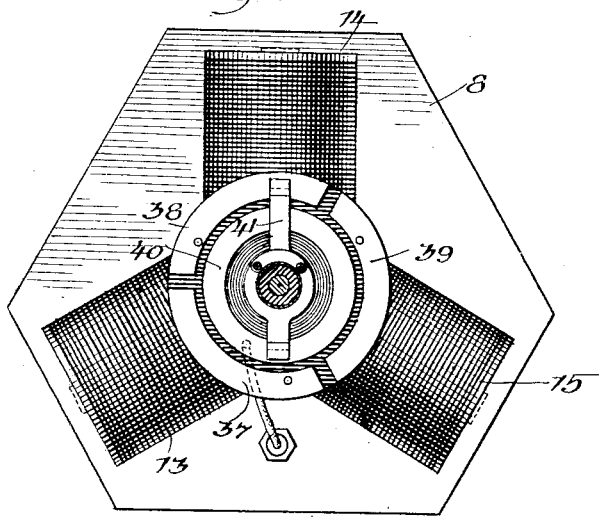

A. A. RADTKE.
ELECTRIC MOTOR.
APPLICATION FILED DEC. 12, 1910.
1,131,614.
Patented Mar. 9, 1915.
3 SHEETS—SHEET 3.
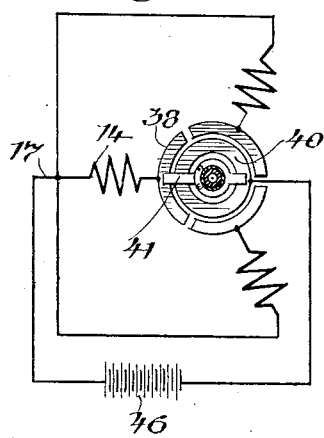
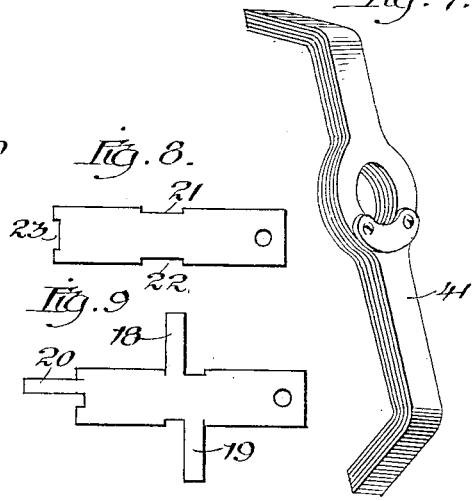
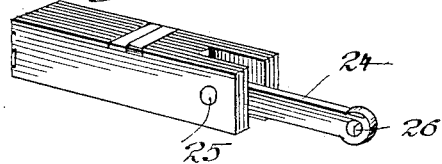
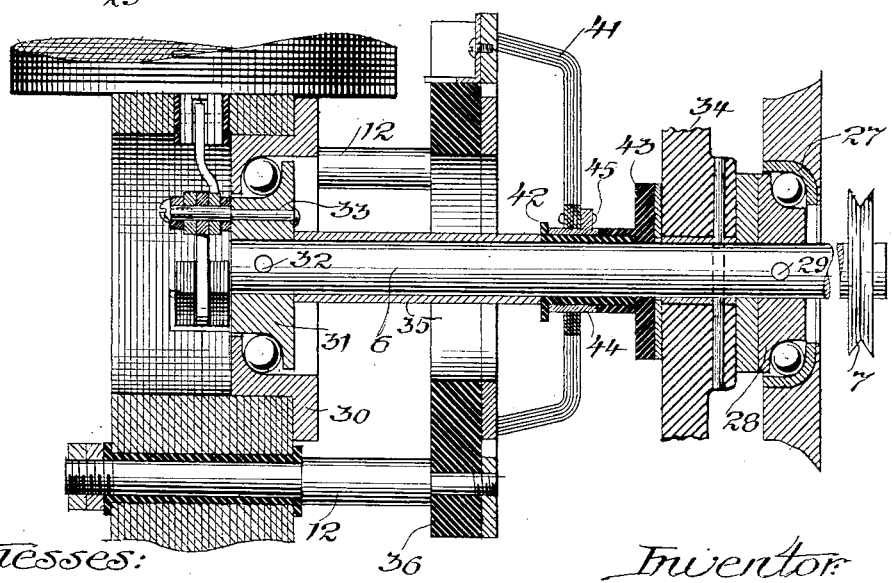

UNITED STATES PATENT OFFICE.

ALBERT A. RADTKE, OF CHICAGO, ILLINOIS, ASSIGNOR TO ELECTRIC TIME RECORDER COMPANY, A CORPORATION OF ILLINOIS.

ELECTRIC MOTOR.

1,131,614.  Specification of Letters Patent.  Patented Mar. 9, 1915.

Application filed December 12, 1910. Serial No. 596,767.

*To all whom it may concern:*

Be it known that I, ALBERT A. RADTKE, a citizen of the United States, residing at Chicago, county of Cook, State of Illinois, have invented certain new and useful Improvements in Electric Motors, of which the following is a specification.

My present invention relates more particularly to electric motors of a type which can be economically built in small sizes.

It is one object of the invention to produce a motor which shall be positive in operation and possessed of high torque at low operating speeds.

According to the embodiment of my present invention, herein described in detail, the operating coils or windings are all seated in a magnetizing frame, and the armatures, on which these coils act, move in and out of their respective coils and are mechanically coupled or linked to a crank-pin in such a way that they are effective in producing rotary motion in the main shaft of the motor.

The novel features of my invention are pointed out in the appended claims, for a better understanding of which reference may be had to the following detailed description, taken in conjunction with the accompanying drawings, wherein—

Figure 1 is an end elevation of the motor when completely assembled; Fig. 2 is a side elevation of the same; Fig. 3 is an elevation partly in section, with half of the inclosing casing removed; Fig. 4 is a section through the casing, showing the motor mechanism in side elevation; Fig. 5 is an end elevation of the motor mechanism; Fig. 6 is a diagram of the electric circuits; Fig. 7 is an enlarged detail of the laminated switch contact; Figs. 8, 9 and 10 are details of an armature; and Fig. 11 is an enlarged section along the shaft of the motor.

In the construction shown, the motor casing comprises two portions or members, numbered, respectively, 1 and 2, held together by transverse bolts 3 and 4. Current-supply wires 5 enter at the side of the casing member 2 and are serviceable for conveying electrical energy to the windings within the casing. The main shaft 6 of the motor projects through the side of the casing member 1 and carries a suitable pulley 7.

Fitting within the motor casing, is a frame 8 of magnetizable material such as soft iron, preferably consisting of a plurality of laminations, all stamped in the same die and having apertures within which a plurality of magnetizing coils may be seated. These laminations are held together by screws 9 and 10, which are threaded into suitable shoulders integral with the casing member 1. The top of the laminated frame rests on a web 11 integral with the top of the casing 1. A plurality of bolts or standards 12 pass through the laminations and serve as supports for a switch mechanism, hereinafter described.

Magnetizing coils or windings 13, 14 and 15 are seated within the laminated frame with their respective axes making an angle of about one hundred and twenty degrees with one another. Each coil or winding is provided with a lining 16 composed of material wherein local currents will not be set up when alternating current is supplied to the windings. Fiber linings may be used. One end of the winding on each coil is brought out for connection with a ring 17, which serves as a junction point or common connection for all the windings and is directly connected with one of the current supply conductors 5. The other end of each coil goes to a segment of the switch mechanism, as hereinafter set forth.

The armatures for the coils or windings 13, 14 and 15 are preferably rectangular in cross-section and may be made up of punchings, as indicated in Figs. 8, 9 and 10. Fig. 8 shows the shape of the laminations throughout the greater part of the armature, and Fig. 9 shows the shape of the end laminations, both of which are alike and from the same die, and each of which carries a plurality of lugs 18, 19 and 20, which can be bent down into suitable recesses 21, 22 and 23 of the intermediate laminations and which thereby serve to lock all the laminations together. These end laminations may have a coating of insulating material, such as japan, to obviate the danger of local currents in the armature. Each armature carries a link 24, which is held in place by a suitable pin 25 and which, at its other end, has an eye 26 arranged for engagement with a crank-pin, as hereinafter recited.

The main shaft 6 is mounted on ball-bearings and serves to drive the pulley 7. The ball-bearing nearest the pulley comprises a cup 27 seated directly in a recess in the casing member 1. The cone 28 of the bearing is secured to the shaft by a transverse pin 29. The other ball-bearing has its cup 30 seated in the annular central recess of the laminated frame. The coöperating cone 31 is secured to shaft 6 by a transverse pin 32 and also carries the crank-pin 33, to which the links 24 of the respective armatures are connected. These links may be off-set, as shown in Fig. 11, to secure suitable coöperative positions on the crank-pin. A fly-wheel 34 may also be pinned to the shaft within the casing to serve as an equalizing agent for distributing the successive impulses of the several coils of the motor. The main shaft also carries a spacing tube 35, and between this and the fly-wheel 34, the movable part of the switch mechanism is clamped.

The switch mechanism comprises a ring 36 of insulating material, carried on the bolts or pedestals 12 and bearing on its outer face a plurality of segments 37, 38 and 39, each of which is connected to the inner terminal of one of the magnetizing coils. A slip ring 40 is also mounted on the face of the block 36 and is permanently connected to one of the current supply conductors 5. A bridge or cross-connection 41 serves as a means for successively connecting the slip ring 40 with the several contact segments of the device. This bridge is preferably composed of laminations of copper and is carried on the shaft of the motor, but is insulated therefrom by suitable hard rubber bushings 42 and 43. In order that the contact pressures exerted by the two arms of the laminated bridge may be equal, the laminations are riveted to a metal ring 44 having a lug 45 located at the side of the shaft and midway between the contact surfaces of the bridge. The laminations are wide enough to overlap the gaps between adjacent segments.

The operation of the motor will be understood by reference to Fig. 6. Current from a battery 46, or other suitable source, is led by one of the current supply conductors to the junction point or common connection 17 of the motor and, from there, passes through one of the magnetizing coils, as, for instance, through coil 14, and thence to segment 38 and through the laminated bridge 41 to the slip ring 40, and from there back to the battery. This coil 14, being energized, draws in its armature, thereby imparting a rotary motion to the motor shaft and shifting the contact bridge 41 out of contact with segment 38 and into contact with the next segment. The laminated bridge is wider than the gap between adjacent segments and therefore establishes current in the next coil before interrupting the current at the segment from which it is moving and there is, therefore, little or no sparking between the several parts of the switch mechanism. Each successive and intermittent pull of an armature imparts a corresponding rotary movement to the motor shaft and simultaneously shifts the switch mechanism into position for establishing current in the succeeding coil. The magnetic circuits are very close and compact and the motor is possessed of a strong torque even at low speeds. The fly-wheel 34 serves to counteract the otherwise somewhat fluctuating angular speed.

The motor may be inspected while in operation by loosening the main clamping screws 3 and 4 and withdrawing the casing member 2. This does not in any way disturb the active elements of the motor and does not expose any parts across which a destructive short-circuit could be produced.

Inasmuch as current reaches these several segments only after passing through the respective windings of the motor, it will be seen that a destructive short-circuit cannot be produced at the switch mechanism even though an unskilled operator were to experiment or tamper therewith while the motor is running.

What I claim as new and desire to secure by Letters Patent of the United States is:—

1. The combination of a plurality of stationary windings, armatures for said windings, and movable therein, a shaft operatively connected for rotation by said armatures, a plurality of segments each connected to one of said windings, a slip ring, a switch mechanism actuated by said shaft and having a laminated contact member movable over said segments, and contacting with said slip ring and means for delivering current to said windings through said switch mechanism.

2. The combination of a plurality of stationary coils, an armature for each of said coils, a field frame common to all said coils, a rotary shaft, a link connecting each armature with said shaft, a rotary switch member carried by said shaft, a plurality of stationary segments each connected with one of said coils and each located in position for successive contact with said rotary switch member, and means for delivering current to said coils through said switch member.

3. In an electric motor, the combination of a laminated field frame, a plurality of stationary coils seated within said frame and having their respective axes meeting at an angle of about 120°, an armature movable into and out of each of said coils, a main shaft, and means mechanically connecting said armatures to turn said shaft.

4. The combination of a field frame, a plurality of stationary coils embedded therein, an armature for each of said coils, a shaft, pivoted links connecting said armatures to said shaft, a stationary contact segment connected to each of said coils, a stationary slip ring, and a rotary switch member carried by said shaft and movable to establish contact between said stationary slip ring and each of said stationary segments in succession.

5. In an electric motor, the combination of a casing member, a laminated field frame secured to said member, a second casing member enveloping said field frame, three coils seated in said frame with their axes substantially 120° apart and a laminated armature for each of said coils movable therein with a sliding motion, a shaft, means connecting said armatures to turn said shaft, and a switch mechanism which is enveloped by said casing members and is adapted to deliver current to each of said coils intermittently.

6. In an electric motor, the combination of a pair of casing members, a laminated field secured to one of said members, a plurality of stationary windings embedded in said laminated field, a laminated armature for each of said windings and movable therein, a rotary shaft connected with said armatures, a stationary contact segment connected to each of said windings, and a laminated switch member movable over said segments to deliver current to said windings intermittently and in succession.

7. In an electric motor, the combination of a casing member, a laminated field secured to said member, a bearing seated in said casing member, a second bearing seated in said laminated field, a shaft mounted in said bearings and carrying a laminated switch contact, a plurality of armatures connected to said shaft, windings for moving said armatures, and a second casing member inclosing said windings, and removable from its normal position while said motor is in action.

8. In an electric motor, the combination of a plurality of stationary coils, an armature for each of said coils, a shaft, means connecting said armatures to said shaft, a stationary switch segment connected to each of said coils, a slip ring near said segments, a laminated switch member movable with said shaft to make connection between said slip ring and said segments in succession, and means for supporting said switch member near its middle.

9. In an electric motor device, the combination of a pair of casing members, a laminated field secured to one of said members, a plurality of stationary windings embedded in said stationary field and symmetrically disposed about a central opening, a shaft in said opening, a laminated armature for each of said windings and movable therein, each of said armatures having driving connection with said shaft, a common return conductor for all of said coils, and a switch mechanism for delivering current to said coils intermittently in succession, to intermittently and successively energize said coils.

10. In an electric motor, the combination of a pair of casing members, a laminated field secured to one of said members, three stationary windings embedded in said laminated field, and symmetrically grouped about a central opening through said field, an armature movable and sliding within each of said windings, a rotary shaft connected with said armatures, and a rotary switch mechanism driven by said shaft for intermittently energizing said windings in succession.

In witness whereof, I hereunto subscribe my name this 9th day of December, 1910.

ALBERT A. RADTKE.

Witnesses:
C. B. DAVIS,
CHAS J. MONAHAN.

Copies of this patent may be obtained for five cents each, by addressing the "Commissioner of Patents, Washington, D. C."